US012422520B2

(12) United States Patent
van Houtum

(10) Patent No.: US 12,422,520 B2
(45) Date of Patent: Sep. 23, 2025

(54) RADAR WITH PHASE NOISE CORRECTION

(71) Applicant: NXP B.V., Eindhoven (NL)

(72) Inventor: Wilhelmus Johnannes van Houtum, Sint-Oedenrode (NL)

(73) Assignee: NXP B.V., Eindhoven (NL)

( * ) Notice: Subject to any disclaimer, the term of this patent is extended or adjusted under 35 U.S.C. 154(b) by 1031 days.

(21) Appl. No.: 17/487,167

(22) Filed: Sep. 28, 2021

(65) Prior Publication Data

US 2023/0111983 A1    Apr. 13, 2023

(51) Int. Cl.
*G01S 7/35* (2006.01)
*G01S 13/00* (2006.01)

(52) U.S. Cl.
CPC .............. *G01S 7/354* (2013.01); *G01S 7/356* (2021.05); *G01S 13/003* (2013.01)

(58) Field of Classification Search
CPC ......... G01S 7/354; G01S 7/356; G01S 13/003
See application file for complete search history.

(56) References Cited

U.S. PATENT DOCUMENTS

| | | | |
|---|---|---|---|
| 2017/0176583 A1 | 6/2017 | Gulden et al. | |
| 2018/0088221 A1* | 3/2018 | Yomo | ............... G01S 7/003 |
| 2019/0004145 A1 | 1/2019 | Vossiek et al. | |
| 2020/0018840 A1 | 1/2020 | Vossiek et al. | |
| 2020/0292660 A1* | 9/2020 | Meissner | ............... G01S 7/023 |
| 2022/0334217 A1 | 10/2022 | Gulden et al. | |

OTHER PUBLICATIONS

M. Gottinger, et.al., "Coherent Automotive Radar Networks: The Next Generation of Radar-based Imaging and Mapping", IEEE Journal of Microwaves, vol. 1, No. 1, pp. 149-163, Jan. 2021.
M. Gottinger, et.al., "Coherent Full-Duplex Double-Sided Two-Way Ranging and Velocity Measurement Between Separate Incoherent Radio Units", IEEE Trans. on Microwave Theory and Techniques, vol. 67, pp. 2045-2061, May 2019.
Gottinger, M., "Coherent Signal Processing for Loosely Coupled Bistatic Radar", IEEE Transactions on Aerospace and Electric Systems, IEEE Service Center, vol. 57, No. 3, Jan. 11, 2021.

* cited by examiner

*Primary Examiner* — Matthew M Barker

(57) ABSTRACT

Aspects of the present disclosure are directed to radar apparatuses and related methods. As may be implemented in connection with one or more embodiments, frequency-based representations of reflected radar signals received by different radar receivers are processed utilizing superposition of and combining of respective ones of the frequency-based representations. In response to said processing, phase noise in the frequency-based representations of reflected radar signals is corrected.

10 Claims, 3 Drawing Sheets

RADAR WITH PHASE NOISE CORRECTION

OVERVIEW

Aspects of various embodiments are directed to radar signal processing with phase noise correction.

Radar is useful in a multitude of applications, such as automotive applications in which radar signal use is growing. In some radar applications, frequency-modulated continuous-wave chirp-sequences are exchanged in a full-duplex (FD) manner between two radio units. The signals transmitted from two radio units are received, respectively, by each of the two units and down-converted in a mixer with the receiver's own transmit signal to generate a beat signal in each unit. The two beat-signals are then processed together, after one beat signal is transmitted to the partner unit. Phase coherent range and Doppler phase measurements can be conducted between incoherent radio units. Such an approach may involve bi-static or multi-static measurements and derive unknown synchronization parameters, for instance as may be provided via analog-to-digital converter (ADC) samples.

Various such radar applications may be susceptible to noise. For instance, in bi-static or multi-static radar applications, phase noise may be present with respect to radar reflections received at respective stations. For instance, phase offset may result where reflections of signals transmitted by a station are received at a different station. These and other matters have presented challenges to efficiencies of radar implementations, for a variety of applications.

SUMMARY

Various example embodiments are directed to issues such as those addressed above and/or others which may become apparent from the following disclosure concerning radar apparatuses and related radar signal processing.

In certain example embodiments, aspects of the present disclosure involve correcting phase noise in the frequency domain. Such approaches may involve superposition and multiplication of respective radar signals in the frequency domain.

In a more specific example embodiment for use in a radar apparatus, a method includes processing frequency-based representations of reflected radar signals that are received by different radar receivers, by utilizing superposition of and combining of respective ones of the frequency-based representations. In response to said processing, phase noise in the frequency-based representations of reflected radar signals is corrected.

In another specific example embodiment, an apparatus comprises a first circuit and processing circuitry. The first circuit is to provide frequency-based representations of reflected radar signals that are received by different radar receivers. The processing circuitry is to process the frequency-based representations of the reflected radar signals utilizing superposition of and combining of respective ones of the frequency-based representations. The processing circuitry is further to, in response to said processing, correct phase noise in the frequency-based representations of reflected radar signals.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1:
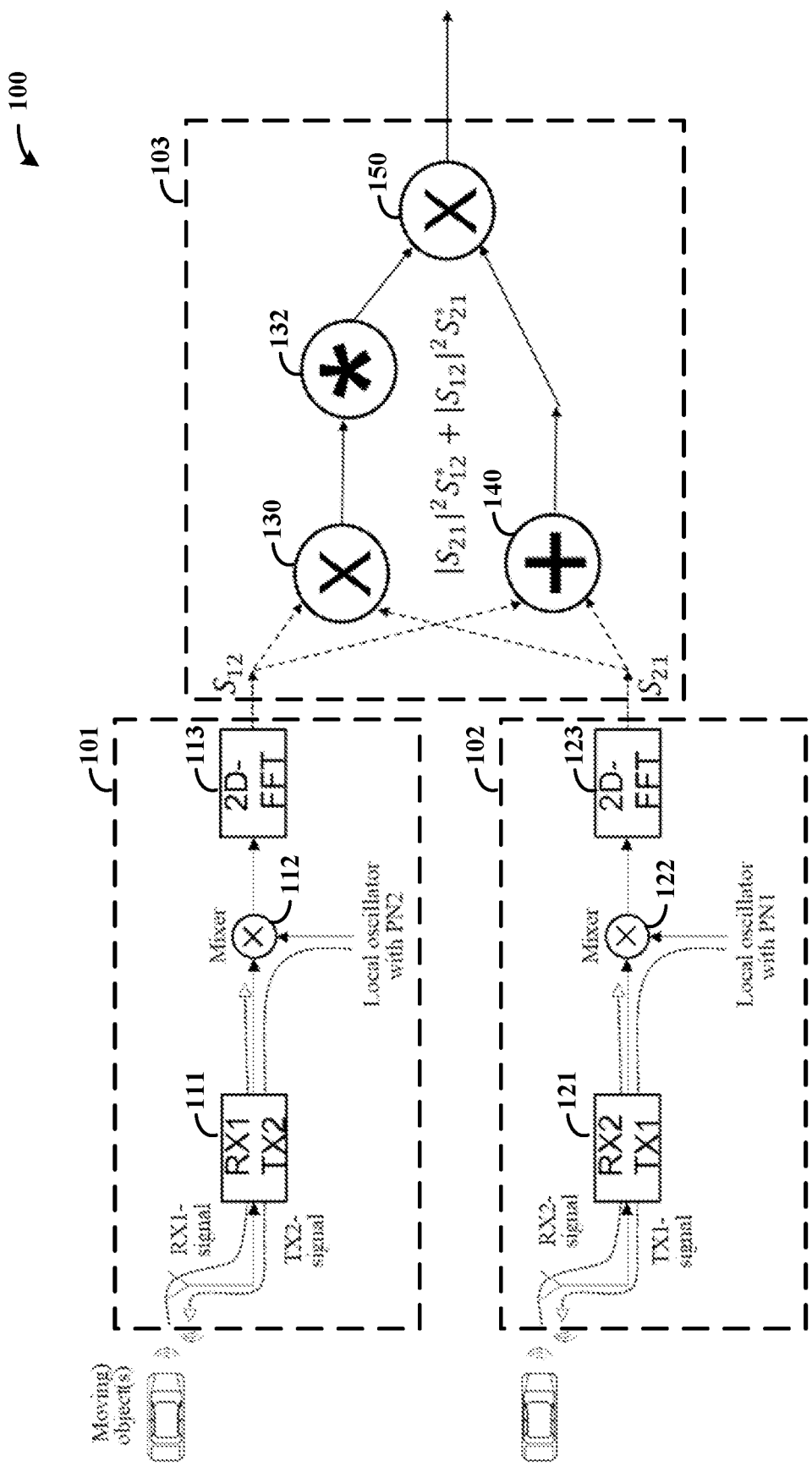
FIG. 1 is a system-level diagram illustrating an example apparatus and approach to radar signal processing, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving radar signal processing. In certain implementations, aspects of the present disclosure have been shown to be beneficial when used in the context of bi-static radar signaling, such as may be utilized for automotive radar. In some embodiments, radar reflections received at respective stations are processed utilizing superposition and multiplication in the frequency domain, facilitating phase noise reduction. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various embodiments are directed to radar signal processing and related apparatuses involving the utilization of a correction cost-function in the distance-velocity space, for instance after FFT processing, which may reduce/minimize the amount of phase noise power. The cost-function may be implemented as a particular ratio between superposition and multiplication of beat-signals. Such approaches may be applicable in bi-static radar-scenes, for instance where a transmitter and receiver are separated by a distance (e.g., as may be comparable to distance to a target from which reflections are received).

It has been recognized/discovered that, approaches as characterized herein may reduce noise-like distortions caused by mixing products of uncorrelated phase noise. For instance, such approaches may reduce the noise level and enhance the dynamic range of the ranging signals tremendously (e.g., an improvement of 22 dB relative to time-domain related approaches).

Various embodiments are directed to applications involving frequency-modulated continuous-wave (FMCW) radar systems in which a high frequency sine wave is used as a carrier wave. Range information may be mixed with Doppler velocity using this technique. Modulation can be turned off on alternate scans to identify velocity using unmodulated carrier frequency shift. This allows range and velocity to be found with one radar set or alternatively, with a two-dimensional fast-Fourier-transform (2D-FFT), the fast-chirp version of FMCW. Triangle wave modulation can be used to achieve a similar effect. Received waveforms are a delayed replica of transmitted waveforms, and the transmitted frequency may be used to down-convert the received signal to baseband. The amount of frequency shift between the transmit signal and the reflected signal increases with time delay (distance). The time delay is therefore a measure of the range, such that a small frequency spread is produced by nearby reflections, and a larger frequency spread corresponds with more time delay and a longer range. Beat-signals may be passed through an analog-to-digital-converter (ADC), and digital processing may be performed on the result. Original message signals may be extracted from modulated waves via demodulation, mixed with a transmitted signal to obtain beat frequencies, and target positioning may be ascertained therefrom.

Specific embodiments utilize two or more wireless radar units that operate incoherently with separate clock sources, such as low-cost crystal oscillators. Prior to radar measurement, wireless units may be pre-synchronized in time and frequency. After this step, Nyquist sampling criterion is fulfilled for beat-signals in baseband and unambiguous reconstruction can be performed with the ADC signals. Information on the relative drift of the clock-sources is utilized, relative to the velocity to be measured being proportional to the phase shift in the "slow-time" domain in which slow-time or inter-chirp time is defined in terms of the FMCW chirp number. An FMCW chirp sequence may be transmitted by a full-duplex (FD) protocol and simultaneously received and down-converted by the two or more radar units. ADC may be transferred from one station to another station for processing at the other station. ADC data may also be transferred from each station to an external processing circuit (e.g., a CPU).

Unknown system parameters such as relative drift in time, Doppler-frequency, timing-offset, and frequency-offset can be determined. Corrections may be carried out as these parameters impact the signal phases, the beat frequencies, and the PN level. Where the latter, for instance the PN-level, will be reduced utilizing approaches characterized herein. A synthesized beat signal as may be comparable to a one-unit (primary) radar response is then output, providing a coherent signal with suppressed PN.

Certain embodiments are directed to radar signal phase noise reduction in an environment involving line-of-sight (LOS) operation with two radar stations having time bases defined by their respective local oscillators (LOs). Operations such as the start of an FMCW chirp, frequency increment, and ADC timing may rely on this time base. The LO clock frequencies at first and second stations (S1 and S2) differ, as the stations are not physically linked. Local time increments generated by the LOs in stations 1 and 2 define an intra-chirp time (which may be referred to as "fast time") as the mean of the local time in each station. Within the intra-chirp time (fast-time) as well as within the inter-chirp time (slow-time) the time, frequency changes may be corrected and neglected.

A mathematical model for mixed signals with full-duplex transmission is as follows, in which the phase of the individual chirp for station 1 $\Phi_{1k}(t)$, with relative drift in time $\delta_t$ between the two stations, timing-offset $\Delta\tau_{1k}$, frequency-offset $\Delta f$ between both stations, and the RF bandwidth B becomes:

$$\Phi_{1k}(t) = 2\pi\left(f_c + \frac{\Delta f}{2} - \frac{B}{2}\right)\left(1 + \frac{\delta_t}{2}\right)t +$$

$$2\pi\mu\left(\frac{\left(1 + \frac{\delta_t}{2}\right)^2}{2}t^2 + \Delta\tau_{1k}\left(1 + \frac{\delta_t}{2}\right)t\right) + \Psi_{1k}\left(\left(1 + \frac{\delta_t}{2}\right)t\right) + \Theta_{1k}$$

where $$\mu = \frac{B}{T_{sw}}$$

is the chirp-rate (chirp-slope) with $T_{sw}$ is the sweep-time, i.e., the chirp duration, $k \in \{0, \ldots, K-1\}$ indicates the FMCW chirp number with K chirps are transmitted and received, $\Psi_{1k}(t)$ is the PN, and $\Theta_{1k}$ an arbitrary initial phase. For station 2 a similar mathematical model holds with a sign reversal for the frequency-offset and the relative drift in time.

Considering the above, the following signals $$s_{1k,tx}(t) = A_1 \exp\{j\Phi_{1k}(t)\},$$

$$s_{2k,tx}(t) = A_2 \exp\{j\Phi_{2k}(t)\}$$

may be transmitted and serve as references for down-conversion with $A_1$ and $A_2$ denote the chirp signal amplitudes. Accordingly, the signals received at the opposite station over the time-dependent wireless channel with propagation time $\tau_k$, Doppler frequency-shift $f_D$, and attenuation coefficient $\alpha$ become:

$$s_{2k,rx}(t) = \alpha A_1 \exp\{j\Phi_{1k}(t-\tau_k)\}\exp\{j2\pi f_D t\},$$

$$s_{1k,rx}(t) = \alpha A_2 \exp\{j\Phi_{2k}(t-\tau_k)\}\exp\{j2\pi f_D t\},$$

and the mixed signal of station 1 can be stated as $$s_{1k,mix}(t) = s_{1k,tx}(t)(s_{1k,rx}(t))^* =$$

$$A \exp\left\{j\left(2\pi\left((\delta_f - f_D)t + \left(f_c - \frac{B}{2}\right)\tau_k + \mu((\tau_0 + \Delta\tau + \delta_t kT_{sw})t + \delta_t t^2)\right) + \Theta_{1k} - \Theta_{2k} + \Psi_{1k}\left(\left(1 + \frac{\delta_t}{2}\right)t\right) - \Psi_{2k}\left(\left(1 - \frac{\delta_t}{2}\right)(t - \tau_k)\right)\right)\right\}$$

where A is the signal amplitude $$\delta_f = \Delta f + \delta_t\left(f_c - \frac{B}{2}\right)$$

is the total frequency offset, and with the ToF modeled as $\tau_k = \tau_0 + \tau_k'$ where $\tau_0$ and $\tau_k'$ are the initial ToF and the propagation-time change in the wireless channel, respectively. Note that for station 2 a similar mathematical model holds with a sign reversal for the Doppler frequency-shift, the initial ToF, and for the PN the interchange of the ToF $\tau_k$ between station 1 and station 2.

The ADCs in both radar units may be controlled by their respective internal clock sources. Therefore, the mixing products are not available as sampled data. Sampling in stations 1 and 2 is delayed by $\Delta\tau_{1k}$ and $\Delta\tau_{2k}$, respectively. With some simplifications, the FMCW beat-signals $s_{1k,beat}(t)$ and $s_{2k,beat}(t)$ may be represented as time delayed versions of both mixed signals.

For general information regarding radar signaling, and for specific information regarding signal processing as may be implemented in accordance with one or more embodiments, reference may be made to M. Gottinger, et. al., "Coherent Full-Duplex Double-Sided Two-Way Ranging and Velocity Measurement Between Separate Incoherent Radio Units", IEEE Trans. On Microwave Theory and Techniques, vol. 67, pp 2045-2061, May, 2019, which is fully incorporated herein by reference. For instance, superposition and multiplication approaches as characterized herein may utilize certain aspects as disclosed therein.

Superposition as characterized herein may be implemented in a variety of manners. The beat-signals characterized above as may be available as sampled signals are processed using a discrete Fourier transform. Unknown parameters may be derived via discretized or continuous signals if the Nyquist sampling criterion holds, and computational steps may be described/implemented with continuous time signals. Considering that FMCW chirps are of limited duration $t < T_{sw}$ in fast time, a suitable window function $w(t)$ may be multiplied with the time domain signals to reduce the sidelobe level in the frequency domain.

For a mathematical model in continuous time, the Fourier transform $\mathcal{F}\{\cdot\}$, after windowing, of the beat signal for station 1 may be calculated as:

$$s_{1k,beat}(f) = \mathcal{F}\{w(t)s_{1k,beat}(t)\} =$$

$$A\left[\delta\{f - ((\delta_f - f_D) + \mu(\tau_0 + \Delta\tau + \delta_t kT_{sw}))\} * \mathcal{F}\{w(t)\exp\{j2\pi\mu\delta_t t^2\}\} *\right.$$

$$\left.\mathcal{F}\{\exp\{j\Psi_{pn,1k}(t)\}\}\right] \cdot \exp\{j\gamma_{1k}\} \cdot \exp\left\{j\left(2\pi\left(f_c - \frac{B}{2}\right)\tau_k + \Theta_{1k} - \Theta_{2k}\right)\right\}$$

where $$\Psi_{pn,1k}(t) = \Psi_{1k}\left(\left(1 + \frac{\delta_t}{2}\right)t\right) - \Psi_{2k}\left(\left(1 - \frac{\delta_t}{2}\right)(t - \tau_k)\right)$$

and $\gamma_{1k}$ is the phase-shift caused by the delays of the ADCs. PN-reduction may be obtained by superposition of the corrected mixer output-signals in the time-domain, as may be implemented in accordance with the following:

$$s_{k,synth}(f) = \left(\frac{s_{1k,mix}(f) + s_{2k,mix}(f)}{2}\right) =$$

$$A\,\delta\{f - \mu\tau_0\} * W(f)\exp\left\{j2\pi\left(f_c - \frac{B}{2}\right)\tau_k\right\}\exp\{j\varphi_0\} =$$

$$A\,W(f - \mu\tau_0)\exp\left\{j2\pi\left(f_c - \frac{B}{2}\right)\tau_k\right\}\exp\{j\varphi_0\}$$

with the mixed signal spectra given by $$s_{1k,mix}(f) =$$

$$A\,\delta\{f - \mu\tau_0\} * \mathcal{F}\{1 + j\varepsilon_k(t)\} * W(f)\exp\left\{j2\pi\left(f_c - \frac{B}{2}\right)\tau_k\right\}\exp\{j\varphi_0\} =$$

$$A\,\mathcal{F}\{1 + j\varepsilon_k(t)\} * W(f - \mu\tau_0)\exp\left\{j2\pi\left(f_c - \frac{B}{2}\right)\tau_k\right\}\exp\{j\varphi_0\}$$

$$s_{2k,mix}(f) = A\,\delta\{f - \mu\tau_0\} * \mathcal{F}\{1 - j\varepsilon_k(t)\} * W(f)\exp\left\{j2\pi\left(f_c - \frac{B}{2}\right)\tau_k\right\}\exp$$

$$\{-j\varphi_0\} = A\,\mathcal{F}\{1 - j\varepsilon_k(t)\} * W(f - \mu\tau_0)\exp\left\{j2\pi\left(f_c - \frac{B}{2}\right)\tau_k\right\}\exp\{-j\varphi_0\}$$

where the PN is approximated by $$1 + j\varepsilon_k(t) \text{ and } \varphi_0 = 4\pi\left(f_c - \frac{B}{2}\right)\tau_o \text{ mod } 2\pi$$

after phase-unwrapping. The initial phase may be in an unambiguous range comparable to a primary radar system, for instance such that it scales with the round-trip ToF instead of the one-way ToF. This superposition of the mixed-signals provides compensation of intra-chirp PN, for instance as characterized with FIG. 2 below.

The amplitudes of the mixed signals in both stations may be normalized prior to superposition. The superposition $\mathcal{F}\{1+j\varepsilon_k(t)\}+\mathcal{F}\{1-j\varepsilon_k(t)\}$ may go to zero, in which:

$$\mathcal{F}\{1 + j\varepsilon_k(t)\} + \mathcal{F}\{1 - j\varepsilon_k(t)\} \overset{c=1}{\longrightarrow}$$

$$\delta(f) + j\mathcal{F}\{\varepsilon_k(t)\} + \delta(f) - j\mathcal{F}\{\varepsilon_k(t)\} = 2\delta(f)$$

where the Fourier-constant c may be set to 1 for computational convenience. The $\mathcal{F}\{\varepsilon_k(t)\}$ may be cancelled out by this superposition via the opposite signs in the two beat spectra. Around DC (f=0) "residual" PN may be available also after the superposition. In addition, the superposition is based on the linear approximation $$e^{j\varepsilon_k(t)} \approx 1 + j\varepsilon_k(t) - \mathcal{O}(\varepsilon_k^2(t))$$

and the remaining error is in the order of the quadratic residual $$\varepsilon_k^2(t),$$

where $\sigma(\bullet)$ expresses the $\sigma$- notation.

Multiplication may be carried out in a variety of manners. For instance, multiplication of mixed-signals carried out in the frequency-domain may utilize spectra of mixed-signals, or beat-signals in the distance-space, may yield:

$$S_{k,synth}(f) =$$

$$(s_{1k,mix}(f) \cdot s_{2k,mix}(f)) = A^2\mathcal{F}\{1 + \varepsilon_k^2(t)\} * W^2(f - \mu\tau_0)\exp\left\{j4\pi\left(f_c - \frac{B}{2}\right)\tau_k\right\}$$

where the residuals $$\mathcal{F}\{1+j\varepsilon_k(t)\}\cdot\mathcal{F}\{1-j\varepsilon_k(t)\}\xrightarrow{c=1}(\delta(f)+j\mathcal{F}\{\varepsilon_k(t)\})\cdot(\delta(f)-j\mathcal{F}\{\varepsilon_k(t)\})=$$
$$\delta(f)+(\mathcal{F}\{\varepsilon_k(t)\})^2=\mathcal{F}\{1+\varepsilon_k^2(t)\}$$

may be of the same order as the approximations with superposition. The initial phase $\tau_0 \cong \tau_k$ may be in an unambiguous range comparable to a primary radar system that scales with the round-trip ToF.

Accordingly, a sum-product approach as carried out herein may be implemented utilizing related frequency-based superposition and multiplication, which may for example mitigate issues with multiplication in the time domain. Such an approach may utilize an algorithm that optimizes a cost-function that is based on the beat-signals after 2D-FFT processing, in the distance-velocity space.

Considering linear motion during an FMCW burst as:

$$x_k = c_0\tau_k = x_0 + kvT_{SW}$$

where $x_0$, and $v$ denote the initial position and the radial velocity, respectively, the 2-D Fourier transform on the mixed signal for station 1 may be expressed and used to obtain the distance-velocity signal $s_{1kl}(f, f_2)$ as;

$$s_{1kl}(f, f_2) = A\left[\delta\left\{f - \mu\frac{x_0}{c_0}\right\} * \mathcal{F}\{1+j\varepsilon_k(t)\} * W(f)\right] \cdot \Bigg[$$
$$\delta\left\{f_2 + \left(f_c - \frac{B}{2}\right)\frac{vT_{SW}}{c_0}\right\} * \mathcal{F}\{1+j\xi_l(t_2)\} * W_2(f_2)\Bigg] \cdot \exp$$
$$\left\{j2\pi\left(f_c - \frac{B}{2}\right)\frac{x_0}{c_0}\right\}\exp\{j\varphi_0\} = A\left[\mathcal{F}\{1+j\varepsilon_k(t)\} * W\left(f - \mu\frac{x_0}{c_0}\right)\right] \cdot \Bigg[$$
$$\mathcal{F}\{1+j\xi_l(t_2)\} * W_2\left(f_2 + \left(f_c - \frac{B}{2}\right)\frac{vT_{SW}}{c_0}\right)\Bigg] \cdot \exp\left\{j2\pi\left(f_c - \frac{B}{2}\right)\frac{x_0}{c_0}\right\}\exp\{j\varphi_0\}$$

and the distance-velocity signal $s_{2kl}(f, f_2)$ for station 2 becomes:

$$s_{2kl}(f, f_2) =$$
$$A\left[\delta\left\{f - \mu\frac{x_0}{c_0}\right\} * \mathcal{F}\{1-j\varepsilon_k(t)\} * W(f)\right] \cdot \left[\delta\left\{f_2 + \left(f_c - \frac{B}{2}\right)\frac{vT_{SW}}{c_0}\right\} *\right.$$
$$\left.\mathcal{F}\{1-j\xi_l(t_2)\} * W_2(f_2)\right] \cdot \exp\left\{j2\pi\left(f_c - \frac{B}{2}\right)\frac{x_0}{c_0}\right\}\exp\{-j\varphi_0\} =$$
$$A\left[\mathcal{F}\{1-j\varepsilon_k(t)\} * W\left(f - \mu\frac{x_0}{c_0}\right)\right] \cdot \left[\mathcal{F}\{1-j\xi_l(t_2)\} * W_2\left(f_2 + \left(f_c - \frac{B}{2}\right)\frac{vT_{SW}}{c_0}\right)\right] \cdot$$
$$\exp\left\{j2\pi\left(f_c - \frac{B}{2}\right)\frac{x_0}{c_0}\right\}\exp\{-j\varphi_0\}$$

A same approximation may be used for the inter-chirp PN;

$$e^{j\xi_l(t_2)} \approx 1 + j\xi_l(t_2) - \mathcal{O}(\xi_l^2(t_2)),$$

where $l \in \{0, \ldots, L-1\}$ indicates the distance-bin number, as we did for the intra-chirp PN;

$$e^{j\varepsilon_k(t)} \approx 1 + j\varepsilon_k(t) - \mathcal{O}(\varepsilon_k^2(t)).$$

These approximations for the inter-chirp PN and the intra-chirp PN may be used with the superposition approach introduced above, and used for the two beat-signals in the distance-velocity space. Velocity-distance spectra multiplication may be:

$$s_{k1,synth}(f, f_2) = (s_{1kl}(f, f_2) \cdot s_{2kl}(f, f_2)) =$$
$$A^2\left[\delta\left\{f - \mu\frac{x_0}{c_0}\right\} * \left[\mathcal{F}\{e^{j\varepsilon_k(t)}\} \cdot \overline{\mathcal{F}\{e^{j\varepsilon_k(t)}\}}\right] * W^2(f)\right] \cdot \Bigg[$$
$$\delta\left\{f_2 + \left(f_c - \frac{B}{2}\right)\frac{vT_{SW}}{c_0}\right\} * \left[\mathcal{F}\{e^{j\xi_l(t_2)}\} \cdot \overline{\mathcal{F}\{e^{j\xi_l(t_2)}\}}\right] * W_2^2(f_2)\Bigg] \cdot \exp$$
$$\left\{j4\pi\left(f_c - \frac{B}{2}\right)\frac{x_0}{c_0}\right\} \approx A^2\left[\delta\left\{f - \mu\frac{x_0}{c_0}\right\} * \mathcal{F}\{1+\varepsilon_k^2(t)\} * W^2(f)\right] \cdot \Bigg[$$
$$\delta\left\{f_2 + \left(f_c - \frac{B}{2}\right)\frac{vT_{SW}}{c_0}\right\} * \mathcal{F}\{1+\xi_l^2(t_2)\} * W_2^2(f_2)\Bigg] \cdot \exp\left\{j4\pi\left(f_c - \frac{B}{2}\right)\frac{x_0}{c_0}\right\} =$$
$$A^2\left[\mathcal{F}\{1+\varepsilon_k^2(t)\} * W^2\left(f - \mu\frac{x_0}{c_0}\right)\right] \cdot \left[\mathcal{F}\{1+\xi_l^2(t_2)\} *\right.$$
$$\left.W_2^2\left(f_2 + \left(f_c - \frac{B}{2}\right)\frac{vT_{SW}}{c_0}\right)\right] \cdot \exp\left\{j4\pi\left(f_c - \frac{B}{2}\right)\frac{x_0}{c_0}\right\}$$

where $\overline{(\cdot)}$ means conjugation and the multiplication approach introduced above may be utilized. Residuals may be of the same order and used to obtain the initial phase in an unambiguous range comparable to a primary radar system, i.e., it scales with the round-trip ToF.

A distance-velocity function may show spectral peaks by Dirac-delta functions, with an appropriate shape obtained by the windowing-functions $W(f)$ for the distance and $W_2(f_2)$ for the velocity, which can be found at $$f = \mu\frac{x_0}{c_0} \text{ and at } f_2 = -\left(f_c - \frac{B}{2}\right)\frac{vT_{SW}}{c_0},$$

respectively. The Fourier-transform of the intra-chirp PN, $\mathcal{F}\{e^{j\varepsilon_k(t)}\}$, as well as the Fourier-transform of the inter-chirp PN, $\mathcal{F}\{e^{j\xi_l(t_2)}\}$, representing the PSD of the PN around the distance and velocity beat-frequencies, respectively, may be characterized as "widen Dirac-deltapulses" that can be approximated by the limit as $\sigma_\theta^2 \to 0$ of a non-centered bivariate (complex) normal-distribution (with at the limit the Dirac-delta pulse) as:

$$\mathcal{F}\{e^{j\theta(t)}\} \cong \frac{1}{\sigma_\theta^2 2\pi}e^{-\frac{|\theta-\mu_\theta|^2}{\sigma_\theta^2}}$$

where $\mu_\theta$ is the mean value that represents the PN PSD at $f$ and $f_2$ for the distance and the velocity, respectively.

Accordingly, the PN for distance-velocity signals can be evaluated by their phases. Moreover, for getting insights into the phases of the PN PSDs for the distance-velocity signals, a "Triangle-inequality" may be utilized as follows:

$$|\varphi_{s_1} + \varphi_{s_2}| \leq |\varphi_{s_1}| + |\varphi_{s_2}|$$

where $s_1$ refers to the distance-velocity signal of station 1 and $s_2$ to the distance-velocity signal of station 2. The intra- and inter-chirp PN PSDs may be treated in a similar way and k and l and the frequency-indication may be dropped for readability.

The left-side of the Triangle-inequality indicates addition of phases by multiplication and the right-side indicates addition of phases by superposition. The equality of the Triangle-inequality may be possible i) the trivial-case that one of the angle is identical to zero or if ii) $\varphi_{s_1} = \alpha\varphi_{s_2}$, $\alpha > 0$.

Accordingly, the phases may be aligned as such to reach equality. Superposition and multiplication of the distance-velocity signals may be characterized for further computational convenience on the PN evaluation by the following notation:

$$S^+ \stackrel{def}{=} |S_1|e^{j\varphi_{s_1}} + |S_2|e^{j\varphi_{s_2}} = S_1 + S_2$$

$$S^x \stackrel{def}{=} |S_1||S_2|e^{j(\varphi_{s_1}+\varphi_{s_2})} = S_1 * S_2$$

and a PN-correction(cost)-function can be defined as:

$$S = K\left(\frac{S^+}{S^x}\right) = K\left(\frac{|S^+|e^{j\varphi_+}}{|S^x|e^{j\varphi_x}}\right)$$

which can be for $\varphi_+ \cong \varphi_x$ rewritten as:

$$S = K\left(\frac{|S^+|e^{j(\varphi_+ - \varphi_x)}}{|S^x|}\right) \xrightarrow{\varphi_+ \cong \varphi_x} K\left(\frac{|S^+|(1+j(\varphi_+ - \varphi_x))}{|S^x|}\right) \approx K\frac{|S^+|}{|S^x|}$$

and yields a PN-reduction since $$S \approx K\frac{|S^+|}{|S^x|}$$

becomes (close to) real if $\varphi_+ \cong \varphi_x$.

The following may thus be utilized, with some rewriting relative to the above:

$$\frac{S^+}{S^x} = \left(\frac{S_1+S_2}{S_1 S_2}\right) = \frac{1}{|S_1|^2|S_2|^2}\left(|S_2|^2 S_1^* + |S_1|^2 S_2^*\right) \xrightarrow{yields} \begin{cases} S = |S_2|^2 S_1^* + |S_1|^2 S_2^* \\ K = |S_1|^2|S_2|^2 \end{cases}$$

In addition, the following may be utilized:

$$S = |S_1|^2|S_2|^2\left(\frac{S_1+S_2}{S_1 S_2}\right) = (S_1+S_2)\left(\frac{|S_1|^2 |S_2|^2}{S_1 S_2}\right) = (S_1+S_2)(S_1 S_2)^* = S^+(S^x)^*$$

and the conjugate of the PN-correction(cost)-function may be given by;

$$S^* = |S_1|^2|S_2|^2\left(\frac{S_1+S_2}{S_1 S_2}\right)^* = (S_1+S_2)^*\left(\frac{|S_1|^2|S_2|^2}{(S_1 S_2)^*}\right) = (S_1+S_2)^*(S_1 S_2) = (S^+)^* S^x$$

which is also a PN-correction(cost)-function that may be addressed to preserve (e.g., exact) phase-values, as may include the sign, which may be beneficial for Direction-of-Arrival (DoA) computation and estimation.

Finally, referring to the distance-velocity signals notation, a sum product radar algorithm for PN-correction by bi-static signals may be utilized as:

$s_{kl,synth}(f,f_2) = (s_{1kl}(f,f_2) + s_{2kl}(f,f_2))(s_{1kl}(f,f_2) \cdot s_2 kl(f,f_2))^*$ Such an algorithm may be utilized in the figures as characterized herein.

In a particular embodiment, frequency-based representations of reflected radar signals, as received by different radar receivers, are processed using superposition and combining of respective ones of the frequency-based representations. Phase noise in the frequency-based representations of reflected radar signals can be thus corrected. For instance, the frequency-based representations may be generated from the reflected radar signals utilizing a FFT in the time domain and utilizing another FFT in the distance domain. In these contexts, superposition and combining of respective ones of the reflected radar signals may include utilizing a mathematical relationship between a first parameter associated with said superposition (e.g., characteristics relating to one or both signals) and a second parameter associated with said combining (e.g., a multiplication parameter). For instance, the phase noise may be corrected by superpositioning and multiplying respective ones of the frequency-based representations generated from different ones of the radar receivers.

Such approaches may be useful where the frequency-based representations include bi-static or multi-static beat-signals. For instance, the second parameter may a function of a multiplication of bi-static beat-signals. Utilizing superposition and combining of respective ones of the reflected radar signals may include mathematically processing representations of bi-static beat-signals in the reflected radar signals. The mathematical relationship may also involve processing of bi-static beat-signals characterized by offset conditions corresponding to signals generated using different clock signals for different ones of the reflected radar signals.

In some instances, the received radar signals are superimposed upon one another and multiplied, to produce a resulting signal exhibiting reduced phase noise. When utilized with bi-static or multi-static radar conditions that involve the use of different stations that use separate clock signals and/or other componentry to receive and process the reflections, signals at the different stations may be subsequently combined and processed for ascertaining characteristics of a target.

The reflected radar signals may be processed in a variety of manners. For instance, the reflected radar signals may be processed using fast Fourier transformation (FFT) (one or more transformations) and further utilizing different receivers to provide different ones of the respective frequency-based representations of received sets of the reflected radar signals. Certain ones of the frequency-based representations from at least two of the different respective frequency-based representations may be superimposed and combined.

As another example, the reflected radar signals may be processed using FFT and generating bi-static beat-signals in the frequency domain, in which the bi-static beat-signals correspond to respective frequency-based representations of the reflected radar signals. The phase noise may be corrected in the frequency-based representations of the reflected radar signals by superimposing and multiplying the bi-static beat-signals.

The radar signals may be transmitted utilizing transmitters and receivers that are separated by a distance to provide bi-static radar communication, with signals transmitted by each transmitter to be reflected from a target and received by a receiver separate from the transmitter. The transmitters and receivers may operate in respective stations using distinct clock signals, in which respective stations may provide respective sets of the frequency-based representations of the reflected radar signals. The frequency-based representations of the reflected radar signals are transmitted from one or more of the stations to another one of the stations for processing. As such, this processing may involve processing at a station that also transmits and/or receives radar signals, or at an external station.

Another embodiment is directed to an apparatus having a first circuit to provide frequency-based representations of reflected radar signals that are received by different radar receivers, for example by utilizing a FFT in the time domain and utilizing another FFT in the distance domain. The apparatus also includes processing circuitry to process the frequency-based representations of the reflected radar signals utilizing superposition of and combining of respective ones of the frequency-based representations. The processing circuitry may further operate to correct phase noise in the frequency-based representations of reflected radar signals in response to the processing of the frequency-based representations. For instance, the processing circuitry may operate to correct the phase noise by superpositioning and multiplying respective ones of the frequency-based representations generated from different ones of the receivers that utilize different time clocks.

The first circuit may provide the frequency-based representations by providing bi-static beat-signals representing the reflected radar signals, and the processing circuitry may utilize the superposition and combining of respective ones of the reflected radar signals by superimposing the bi-static beat signals and multiplying the bi-static beat signals. In certain embodiments, the first circuit provides the frequency-based representations using FFT with signals from the different receivers to provide different ones of the respective frequency-based representations, with the processing circuitry being operable to superimpose and combine certain ones of the frequency-based representations from at least two of the different respective frequency-based representations.

In another particular embodiment, the first circuit is configured to process the reflected radar signals using FFT and by generating bi-static beat-signals in the frequency domain, where the bi-static beat-signals correspond to respective frequency-based representations of the reflected radar signals from different ones of the receivers. The processing circuitry may correct the phase noise in the frequency-based representations of the reflected radar signals by superimposing and multiplying the bi-static beat-signals from different ones of the receivers.

The apparatus may further include a plurality of stations using distinct clock signals, including at least two stations each having at least one of the radar receivers and at least one transmitter to transmit the radar signals to be reflected from a target. Each of the stations provide respective sets of the frequency-based representations of the reflected radar signals having bi-static characteristics corresponding to the distinct clock cycles. Communication circuitry (e.g., including a wireless transmitter) transmits ones of the frequency-based representations of the reflected radar signals from one of the stations to another one of the stations.

Turning now to the Figures, FIG. 1 is a system-level diagram illustrating an example apparatus 100 and related approach to radar signal processing, in accordance with the present disclosure. The apparatus 100 includes two sets of transceivers 111 and 121, mixers 112 and 122 and 2D-FFT circuitry 113 and 123. In some implementations, transceiver 111, mixer 112 and FFT circuitry 113 are part of a first station 101, and transceiver 121, mixer 122 and FFT circuitry 123 are part of a second station 102.

The apparatus 100 also includes superposition and multiplication circuitry 130, 132, 140 and 150 which operate to superpose and multiply signals provided by the 2D FFT circuits 113 and 123 as shown. In some implementations, the superposition and multiplication circuitry is part of a common circuit 103, which may be implemented as part of station 101, of station 102, or as an external circuit (e.g., CPU).

In a particular embodiment, transceiver 121 transmits a first radar signal and transceiver 111 transmits a second radar signal. Transceiver 121 receives reflections of the second radar signal, and transceiver 111 receives reflections of the first radar signal. Mixers 112 and 122 respectively mix separate local oscillator signals with the received radar reflections at the respective transceivers, and provide the resulting signal to the 2D FFTs that carry out Fourier transforms in the time domain and in the distance domain. The signals output from 2D FFT 113 ($S_{12}$) and 2D FFT 123 ($S_{21}$) are both provided to multiplier circuitry 130 and addition circuitry 140 as shown.

In some implementations, the left-multiplication is interchanged with the addition as shown in FIG. 1, to obtain a particular conjugate PN-correction (cost)-function. This approach may be useful for DoA-estimations via the non-negative phase (e.g., preserving the sign) of the sum product synthesized beat-signal.

Figure 2:
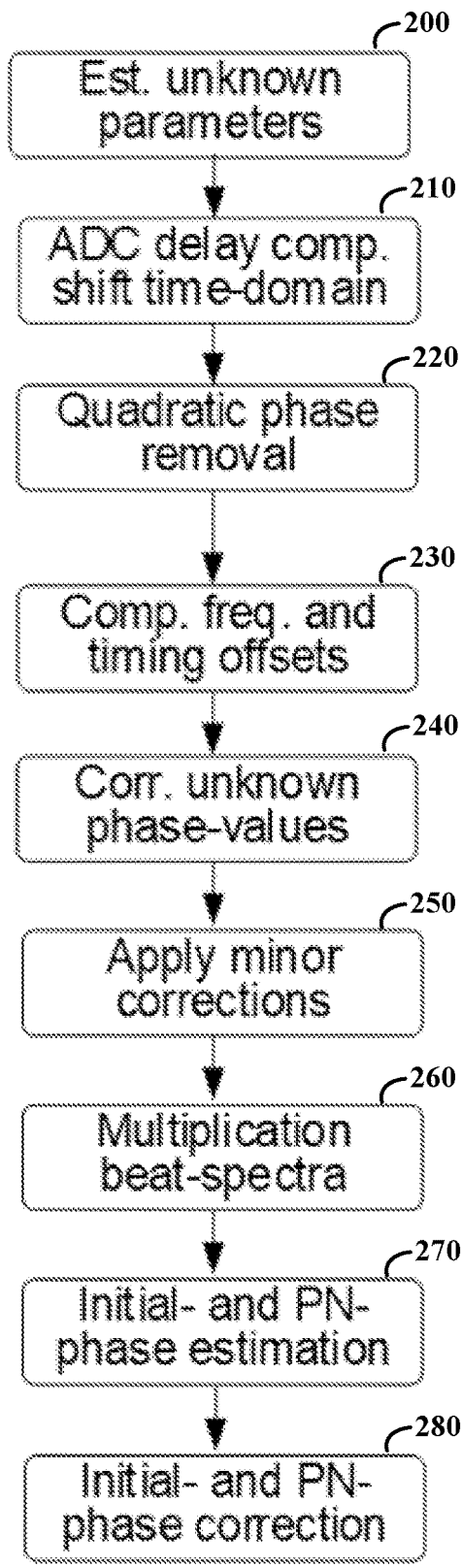
FIG. 2 is a flow chart illustrating an exemplary set of activities and/or data flow, in accordance with the present disclosure.

FIG. 2 is a flow chart illustrating an exemplary set of activities and/or data flow, in accordance with the present disclosure (and as may be carried out in connection with one or more embodiments characterized herein). At block 200, unknown parameters are estimated and used at block 210 with an ADC delay compensation shift in the time domain for received radar signals. At block 220, quadratic phase removal is carried out on the ensuing signals, followed by compensating for frequency and timing offsets at block 230. Unknown phase values are corrected at block 240 and minor corrections (e.g., as characterized above) may be carried out at block 250. Beat spectra are multiplied at block 260, followed by initial and phase noise phase estimation at block 270 and related correction thereof at block 280.

Figure 3:
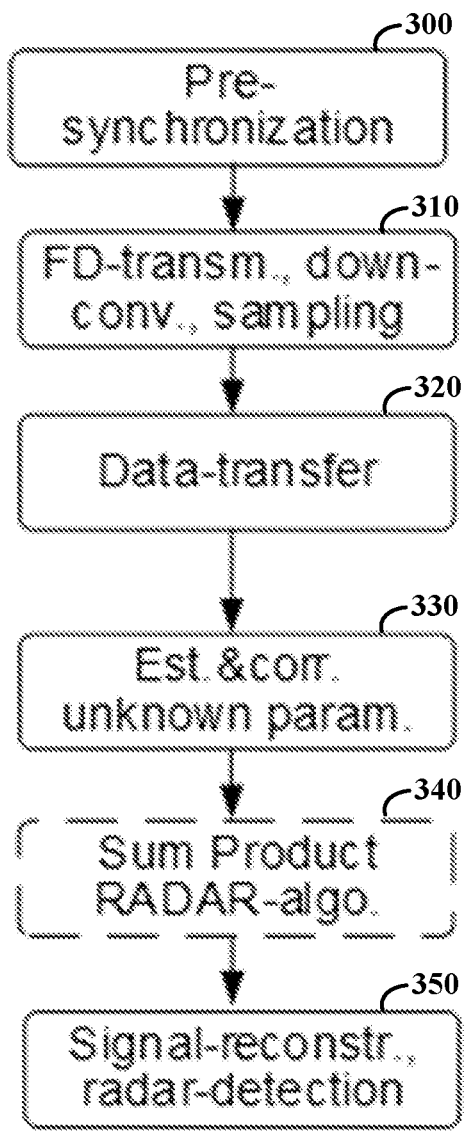
FIG. 3 is a flow chart illustrating an exemplary implementation of phase correction with radar signal processing, in accordance with the present disclosure.

FIG. 3 is a flow chart illustrating an exemplary implementation of phase correction with radar signal processing, in accordance with the present disclosure. At block 300, pre-synchronization is carried out for respective stations to receive radar signal reflections, relative to other stations to transmit the radar signals from which the reflections are obtained. At block 310, transmission, downconverting and sampling operations are carried out, the resulting data from which is transferred at block 320 to a common location (e.g., another station or an external station). Unknown parameters may be estimated and corrected at block 330.

At block 340, a sum product radar algorithm is applied using, for example, distance and velocity two-dimensional FFTs to produce a sum product beat-signal. This is followed by signal reconstruction and radar detection at block 350, utilizing the synthesized sum product beat-signal. The sum product radar algorithm at block 340 may, for example, utilize approaches characterized with block 103 in FIG. 1 and/or with the operations/activities noted in FIG. 2.

Terms to exemplify position or orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the specification describes and/or illustrates aspects useful for implementing the claimed disclosure by way of various circuits or circuitry which may be illustrated as or using terms such as blocks, modules, device, system, unit, controller, station, receiver, transmitter, and/or other circuit-type depictions (e.g., reference numerals 111, 112 and 113 of FIG. 1 may depict a block/module as described herein). Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing radar processing as characterized herein, for instance by superpositioning and multiplying radar reflections from respective stations in the frequency domain. Yet another process or method in this context would be recognized in connection with the functions/activities associated with the approach detailed in FIG. 2.

For example, in certain of the above-discussed embodiments, one or more modules are discrete logic circuits or programmable logic circuits configured and arranged for implementing these operations/activities, as may be carried out in the approaches shown in FIGS. 1 and 2. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described in connection with superposition and multiplication of radar reflections is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. As another example, more or fewer radar stations may be utilized for providing combined radar signals in a phase noise reduction effort. Such modifications do not depart from the true spirit and scope of various aspects of the disclosure, including aspects set forth in the claims.

What is claimed is:

1. A method comprising:
   transmitting, by a first transceiver of a first radar station, a first radar signal;
   transmitting, by a second transceiver of a second radar station, a second radar signal;
   receiving, by the first transceiver, a reflection of the second radar signal;
   receiving, by the second transceiver, a reflection of the first radar signal;
   mixing, by a first mixer of the first radar station, the reflection of the second radar signal with a first local oscillator signal produced by a first local oscillator of the first radar station to produce a first resulting signal;
   mixing, by a second mixer of the second radar station, the reflection of the first radar signal with a second local oscillator signal produced by a second local oscillator of the second radar station to produce a second resulting signal;
   generating, by a first circuit of the first radar station, a first frequency-based representation of the first resulting signal;
   generating, by a second circuit of the second radar station, a second frequency-based representation of the second resulting signal;
   generating a synthesized beat signal by
      superpositioning, by addition circuitry, the first and second frequency-based representations to produce a first parameter,
      determining a complex conjugate of the first parameter,
      combining, by multiplication circuitry, the first and second frequency-based representations to produce a second parameter, and
      generating the synthesized beat signal by multiplying the second parameter with the complex conjugate of the first parameter,
   wherein in the synthesized beat signal, phase noise is corrected in the first and second frequency-based representations of the first and second resulting signals; and
   outputting the synthesized beat signal.

2. The method of claim 1, wherein generating the synthesized beat signal includes utilizing a mathematical relationship between the first parameter and the second parameter.

3. The method of claim 1, wherein the first and second frequency-based representations include bi-static beat-signals, and the second parameter is a function of a multiplication of the bi-static beat-signals.

4. The method of claim 1, wherein generating the first and second frequency-based representations comprises:
   processing the first and second resulting signals using at least one fast Fourier transformation (FFT).

5. The method of claim 1 further including processing the first and second resulting signals using at least one FFT, and generating bi-static beat-signals in the frequency domain, wherein:
   the bi-static beat-signals correspond to respective frequency-based representations of the first and second resulting signals; and
   generating the synthesized beat signal includes superimposing and multiplying the bi-static beat-signals.

6. The method of claim 1, wherein the first and second transceivers are separated by a distance to provide bi-static radar communication.

7. The method of claim 6, wherein:
   the first local oscillator signal has a first local oscillator clock frequency; and
   the second local oscillator signal has a second local oscillator clock frequency that is different from the first local oscillator clock frequency.

8. The method of claim 1, wherein generating the synthesized beat signal includes utilizing a mathematical relationship involving processing of bi-static beat-signals in the first and second resulting signals.

9. The method of claim 8, wherein the bi-static beat-signals in the first and second resulting signals are characterized by offset conditions corresponding to signals generated using different clock signals for different ones of the first and second resulting signals.

10. The method of claim 1, wherein generating the synthesized beat signal includes mathematically processing representations of bi-static beat-signals in the first and second resulting signals.

\* \* \* \* \*